(12) United States Patent
Ko et al.

(10) Patent No.: US 7,416,309 B2
(45) Date of Patent: Aug. 26, 2008

(54) OPTICAL FILM HAVING A SURFACE WITH ROUNDED STRUCTURES

(75) Inventors: Byung-Soo Ko, Hwasung (KR); Leland R. Whitney, St. Paul, MN (US); Dongwon Chae, Hwasung (KR)

(73) Assignee: 3M Innovative Properties Company, Saint Paul, MN (US)

( * ) Notice: Subject to any disclaimer, the term of this patent is extended or adjusted under 35 U.S.C. 154(b) by 178 days.

(21) Appl. No.: 11/026,940

(22) Filed: Dec. 30, 2004

(65) Prior Publication Data

US 2006/0146562 A1  Jul. 6, 2006

(51) Int. Cl.
*F21V 9/14* (2006.01)
*F21V 5/00* (2006.01)

(52) U.S. Cl. .................. 362/19; 362/330; 362/561; 362/627

(58) Field of Classification Search ............... 362/19, 362/561, 583, 606, 607, 618, 627, 330
See application file for complete search history.

(56) References Cited

U.S. PATENT DOCUMENTS

| | | | |
|---|---|---|---|
| 3,213,753 A * | 10/1965 | Rogers | 362/19 |
| 3,349,238 A * | 10/1967 | Kruger | 362/19 |
| 3,532,876 A | 10/1970 | Muller et al. | |
| 3,912,021 A | 10/1975 | Cloup | |
| 3,912,921 A * | 10/1975 | Howe et al. | 362/19 |
| 4,576,850 A | 3/1986 | Martens | |
| 5,254,390 A | 10/1993 | Lu | |
| 5,592,332 A | 1/1997 | Nishio | |
| 5,771,328 A | 6/1998 | Wortman et al. | |
| 5,919,551 A | 7/1999 | Cobb, Jr. et al. | |
| 5,932,626 A | 8/1999 | Fong et al. | |
| 6,157,486 A | 12/2000 | Benson, Jr. et al. | |
| 6,174,064 B1 | 1/2001 | Kalantar et al. | |
| 6,208,466 B1 | 3/2001 | Liu | |
| 6,280,063 B1 | 8/2001 | Fong et al. | |
| 6,347,874 B1 | 2/2002 | Boyd et al. | |
| 6,368,699 B1 | 4/2002 | Gilbert | |
| 6,429,919 B1 | 8/2002 | Takatsuka et al. | |
| 6,469,755 B1 | 10/2002 | Adachi et al. | |

(Continued)

FOREIGN PATENT DOCUMENTS

EP    0 621 500 A    10/1994

(Continued)

OTHER PUBLICATIONS

Andromeda, "Telescope, Optical", 1988, Illustrated Dictionary of Science, xreferplus.com entry1064176.*

(Continued)

*Primary Examiner*—Alan Cariaso
(74) *Attorney, Agent, or Firm*—Robert S. Mushrefzaden (57) ABSTRACT

The present disclosure is directed to optical devices including a light source and an optical film having a first surface disposed to receive light from the light source and a second surface facing away from the light source. The second surface includes a two-dimensional array of closely packed substantially hemispherically-shaped structures. In some implementations of the present disclosure, the optical film further includes a substrate portion having an optical characteristic different from optical characteristics of the second surface comprising the two dimensional array.

15 Claims, 10 Drawing Sheets

U.S. PATENT DOCUMENTS

| | | | |
|---|---|---|---|
| 6,505,959 B2 | 1/2003 | Masaki et al. | |
| 6,602,596 B2 | 8/2003 | Kimura | |
| 6,606,133 B1 | 8/2003 | Okabe | |
| 6,709,143 B2* | 3/2004 | Harada et al. | 362/330 |
| 6,752,505 B2 | 6/2004 | Parker et al. | |
| 6,825,984 B2 | 11/2004 | Kashima et al. | |
| 6,827,456 B2 | 12/2004 | Parker et al. | |
| 6,848,795 B2 | 2/2005 | Kaminsky et al. | |
| 6,876,408 B2* | 4/2005 | Yamaguchi | 349/57 |
| 6,888,595 B2 | 5/2005 | Umemoto | |
| 6,997,595 B2 | 2/2006 | Mi et al. | |
| 2001/0028412 A1* | 10/2001 | Ito | 349/5 |
| 2001/0046134 A1 | 11/2001 | Masaki et al. | |
| 2001/0053075 A1 | 12/2001 | Parker et al. | |
| 2002/0008899 A1 | 1/2002 | Tanaka et al. | |
| 2002/0080598 A1* | 6/2002 | Parker et al. | 362/330 |
| 2002/0097496 A1 | 7/2002 | Lu | |
| 2003/0082314 A1 | 5/2003 | Higashi et al. | |
| 2003/0117791 A1* | 6/2003 | Kim | 362/330 |
| 2003/0164906 A1 | 9/2003 | Arakawa | |
| 2003/0234900 A1 | 12/2003 | Kim | |
| 2004/0114346 A1 | 6/2004 | Parker et al. | |
| 2004/0130790 A1* | 7/2004 | Sales | 359/619 |
| 2005/0024754 A1 | 2/2005 | Epstein et al. | |
| 2005/0074579 A1 | 4/2005 | Suzuki et al. | |
| 2005/0099822 A1 | 5/2005 | Choi et al. | |
| 2005/0099823 A1 | 5/2005 | Choi et al. | |
| 2005/0248848 A1 | 11/2005 | Whitehead | |
| 2005/0275945 A1* | 12/2005 | Brickey et al. | 359/613 |
| 2006/0002149 A1 | 1/2006 | Lee | |
| 2006/0039073 A1 | 2/2006 | Lee | |
| 2006/0146566 A1 | 7/2006 | Ko et al. | |
| 2006/0152943 A1 | 7/2006 | Ko et al. | |
| 2007/0010594 A1 | 1/2007 | Wang et al. | |

FOREIGN PATENT DOCUMENTS

| | | |
|---|---|---|
| EP | 0 650 077 | 11/1999 |
| EP | 1 098 209 A | 5/2001 |
| EP | 1 491 919 | 6/2004 |
| EP | 1 055 944 | 8/2005 |
| JP | 06308485 | 11/1994 |
| JP | HEI-7-159607 | 6/1995 |
| JP | 1996166502 A | 6/1996 |
| JP | 8-271888 | 10/1996 |
| JP | 2003240911 | 8/2003 |
| KR | 2003-0065102 | 8/2003 |
| WO | 2006/055112 | 5/2006 |
| WO | 2006/073616 | 7/2006 |

OTHER PUBLICATIONS

Trace Pro, Software for Opto-Mechanical Modeling, User's Manual, Release 3.0, Chapter 1, Introduction and pp. 3.25-3.34 and 4.1-4.4, Sep. 12, 2002.

* cited by examiner

OPTICAL FILM HAVING A SURFACE WITH ROUNDED STRUCTURES

FIELD OF THE INVENTION

The present disclosure is directed to optical films that include substantially hemispherically-shaped surface structures and optical devices incorporating such optical films.

BACKGROUND

Display devices, such as liquid crystal display ("LCD") devices, are used in a variety of applications including, for example, televisions, hand-held devices, digital still cameras, video cameras, and computer monitors. An LCD offers several advantages over a traditional cathode ray tube ("CRT") display such as decreased weight, unit size and power consumption, as well as increased brightness. However, an LCD panel is not self-illuminating and, therefore, sometimes requires a backlighting assembly or a "backlight." A backlight typically couples light from one or more sources (e.g., a cold cathode fluorescent tube ("CCFT") or light emitting diode ("LED")) to a substantially planar output. The substantially planar output is then coupled to the LCD panel.

The performance of an LCD is often judged by its brightness. Brightness of an LCD may be enhanced by using a larger number of light sources or brighter light sources. In large area displays it is often necessary to use a direct-lit type LCD backlight to maintain brightness, because the space available for light sources grows linearly with the perimeter while the illuminated area grows as the square of the perimeter. Therefore, LCD televisions typically use a direct-lit backlight instead of a light-guide edge-lit type LCD backlight. Additional light sources and/or a brighter light source may consume more energy, which is counter to the ability to decrease the power allocation to the display device. For portable devices this may correlate to decreased battery life. Also, adding a light source to the display device may increase the product cost and weight and sometimes can lead to reduced reliability of the display device.

Brightness of an LCD may also be enhanced by efficiently utilizing the light that is available within the LCD device (e.g., to direct more of the available light within the display device along a preferred viewing axis). For example, Vikuiti™ Brightness Enhancement Film ("BEF"), available from 3M Company, has prismatic surface structures, which redirect some of the light exiting the backlight outside the viewing range to be substantially along the viewing axis. At least some of the remaining light is recycled via multiple reflections of some of the light between BEF and reflective components of the backlight, such as its back reflector. This results in optical gain substantially along the viewing axis and also results in improved spatial uniformity of the illumination of the LCD. Thus, BEF is advantageous, for example, because it enhances brightness and improves spatial uniformity. For a battery powered portable device, this may translate to longer running times or smaller battery size, and a display that provides a better viewing experience.

SUMMARY

In one implementation, the present disclosure is directed to optical devices including a light source and an optical film having a first surface disposed to receive light from the light source and a second surface facing away from the light source, the second surface including a two-dimensional array of closely packed substantially hemispherically-shaped structures. In some exemplary embodiments, the optical film further includes a polarizer.

In another implementation, the present disclosure is directed to optical devices including a light source and an optical film having a first surface disposed to receive light from the light source and a second surface facing away from the light source, the second surface including a two-dimensional array with a first plurality of substantially hemispherically-shaped structures having a first radius and a second plurality of substantially hemispherically-shaped structures having a second radius. The second radius is different from the first radius. The first and second pluralities of structures are closely packed.

In yet another implementation, the present disclosure is directed to optical devices including a light source and an optical film having a first surface disposed to receive light from the light source and a second surface facing away from the light source, the second surface including a two-dimensional array with a plurality of closely packed substantially hemispherically-shaped structures having substantially the same radii. In some exemplary embodiments, the optical film further comprises a substrate portion having an optical characteristic different from optical characteristics of the second surface comprising the two dimensional array.

These and other aspects of the optical films and optical devices of the subject invention will become more readily apparent to those having ordinary skill in the art from the following detailed description together with the drawings.

BRIEF DESCRIPTION OF THE DRAWINGS

So that those having ordinary skill in the art to which the subject invention pertains will more readily understand how to make and use the subject invention, exemplary embodiments thereof will be described in detail below with reference to the drawings, wherein.

DETAILED DESCRIPTION

The present disclosure is directed to optical films capable of controlling angular distribution of light and optical devices incorporating such optical films. In particular, the optical films according to the present disclosure may be capable of controlling angular output distribution of light from a backlight, such as an LCD backlight.

Figure 1A:
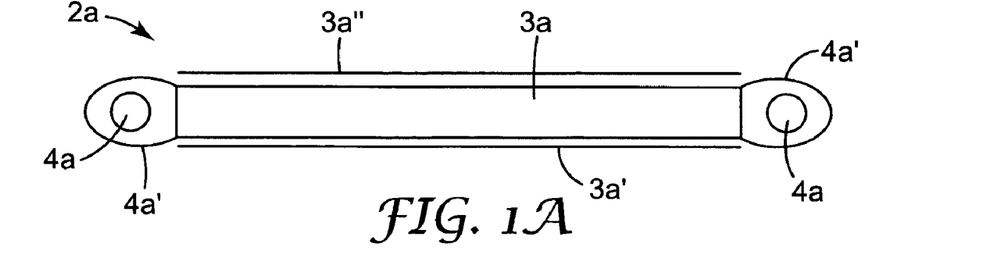
FIG. 1A shows schematically a planar lightguide edge-lit backlight.
Figure 1B:
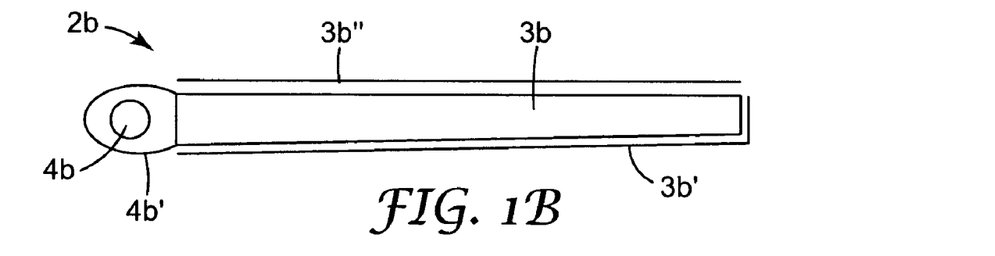
FIG. 1B shows schematically a wedge lightguide edge-lit backlight.
Figure 1C:
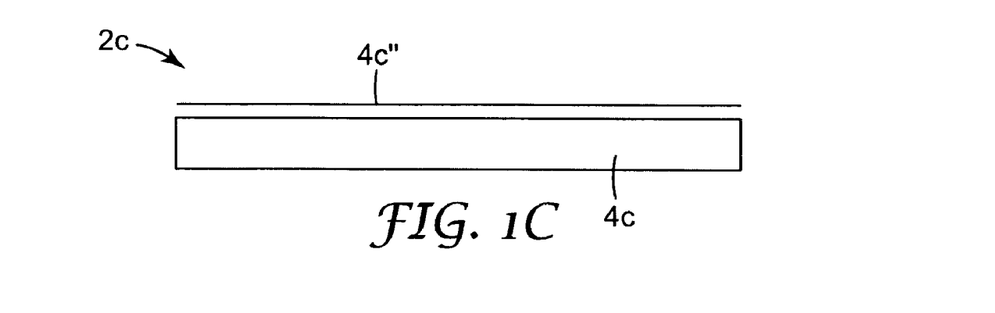
FIG. 1C shows schematically a backlight utilizing an extended light source.
Figure 1D:
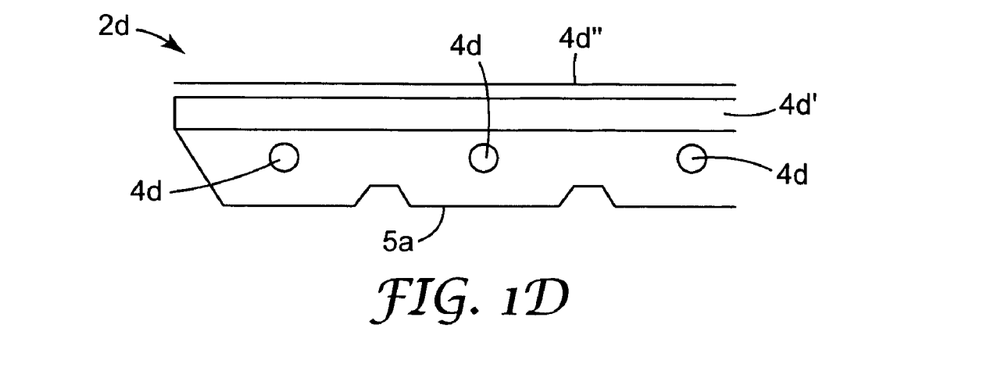
FIG. 1D shows schematically a direct-lit backlight.

FIGS. 1A-1D show several examples of optical devices, such as backlights that may be used with LCD panels. FIG. 1A shows a backlight 2a. The backlight 2a includes a lightguide 3a, which is illustrated as a substantially planar lightguide, light sources 4a disposed on one, two or more sides of the lightguide 3a, such as CCFTs or arrays of LEDs, lamp reflectors 4a' disposed about the light sources 4a, a back reflector 3a' and one or more optical films 3a'', which may be any suitable optical films. FIG. 1B shows a backlight 2b including a lightguide 3b, which is illustrated as a wedge-shaped lightguide, a light source 4b disposed on one side of the lightguide 3b, such as one or more CCFTs or an array of LEDs, a lamp reflector 4b' disposed about the light source 4b, a back reflector 3b' and one or more optical films 3b'', which may be any suitable optical films. FIG. 1C shows a backlight 2c, which includes an extended light source 4c, which may be a surface emission-type light source, and one or more optical films 4c'' disposed over the extended light source 4c. FIG. 1D shows schematically a partial view of a direct-lit backlight 2d, which includes three or more light sources 4d, such as CCFTs or arrays of LEDs, a back reflector 5a, a diffuser plate 4d' and one or more optical films 4d'', which may be any suitable optical films.

Such backlights may be used in various other optical devices, such as display devices using LCDs (e.g., televisions, monitors, etc). As one of ordinary skill in the art will understand, a display device may include a case having a window, a backlight, which may include at least one light source, a light-distributing element such as a lightguide, an optical film according to the present disclosure, other suitable optical films, and a light-gating device, such as an LCD panel, situated between the optical film and the optical window and disposed to receive light transmitted through the optical film. The optical film according to the present disclosure may be used in conjunction with any suitable light source known to those of ordinary skill in the art and the display device may include any other suitable elements.

Figure 2:
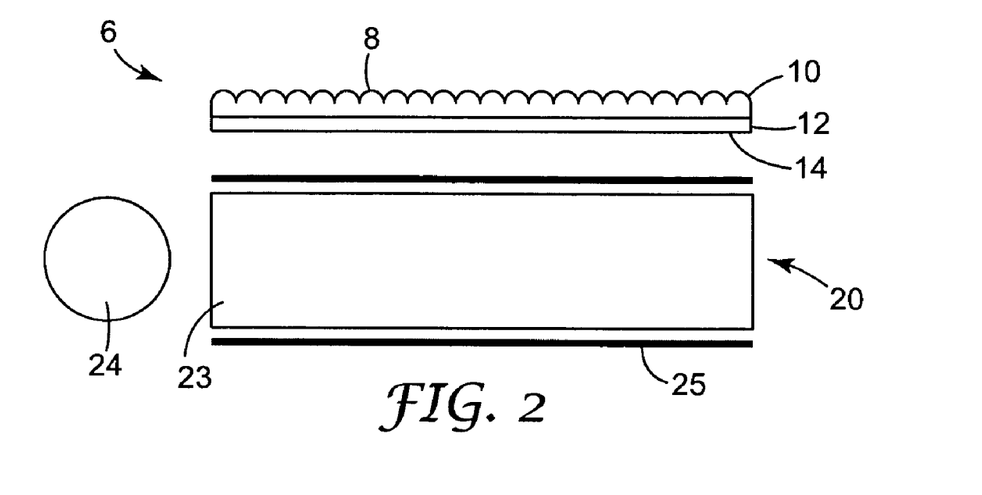
FIG. 2 shows schematically an exemplary embodiment of an optical film according to the present disclosure disposed over a backlight.

FIG. 2 shows a cross-sectional view of a backlight 20 and an optical film 6 according to the present disclosure disposed over the backlight 20 so that a surface 14 (e.g., a first surface) of the optical film 6 receives light from the backlight. The backlight 20 may include a light source 24, a light distributing element 23 such as a lightguide, and a back reflector 25. The optical film 6 according to the present disclosure has a structured surface 10 (e.g., a second surface) carrying a two-dimensional array of closely packed substantially hemispherically-shaped structures 8. In typical embodiments of the present disclosure, the structured surface 10 faces away from the backlight 20. The optical film 6 may further include a substrate portion 12. As one of ordinary skill in the art would understand, the two-dimensional array of closely packed substantially hemispherically-shaped structures 8 and the substrate portion 12 may be formed as a single part, and in some cases from the same material, to produce the optical film 6, or they may be formed separately and then joined together to produce a single part, for example, using a suitable adhesive. In some exemplary embodiments, the array of closely packed substantially hemispherically-shaped structures 8 may be formed on the substrate portion 12.

The two-dimensional array of closely packed substantially hemispherically-shaped structures 8 of the optical film 6 may be used to control the direction of light transmitted through the optical film 6, and, particularly, the angular spread of output light. The closely packed substantially hemispherically-shaped structures 8 can be arranged on the surface 10 side-by-side and in close proximity to one another, and, in some exemplary embodiments, in substantial contact or immediately adjacent to one another. In other exemplary embodiments, the substantially hemispherically-shaped structures 8 may be spaced from each other provided that the gain of the optical film 6 is at least about 1.1. For example, the structures 8 may be spaced apart to the extent that the structures occupy at least about 50% of a given useful area of the structured surface 10, or, in other exemplary embodiments, the structures 8 may be spaced further apart to the extent that the structures occupy no less than about 20% a given useful area of the structured surface 10.

Typical exemplary optical films constructed according to the present disclosure usually are capable of providing optical gain of at least about 1.1 to at least about 1.5. Some exemplary optical gain values include about 1.2, 1.4 and 1.5. For the purposes of the present disclosure, "gain" is defined as the ratio of the axial output luminance of an optical system with an optical film constructed according to the present disclosure to the axial output luminance of the same optical system without such optical film. In typical embodiments of the present disclosure, the size, shape and spacing of (or a given useful area covered by) the substantially hemispherically-shaped structures 8 are selected to provide an optical gain of at least about 1.1.

Typically, the optical gain due to the exemplary optical films having structured surfaces with two-dimensional arrays of closely packed substantially hemispherically-shaped structures will decrease as the shape of the rounded structures (such as protrusions and depressions) departs from hemispherical. Typical embodiments of the present disclosure include protrusions or depressions having a height or depth that is within about 60% of the radius of that structure. More preferably, embodiments of the present disclosure include protrusions or depressions having a height or depth that is within about 40% of the radius of that structure, and most preferably, embodiments of the present disclosure include protrusions or depressions having a height or depth that is within about 20% of the radius of that structure. Such protrusions or depressions having a height or depth that is at least within about 60% of the radius of that structure will be referred to as "substantially hemispherical." Larger spacing between the structures (lesser surface coverage) also can lead to a decrease in gain.

Suitable exemplary radii of the substantially hemispherically-shaped structures 8 include about 5, 8, 10, 12.5, 15, 17.5, 20, 25, 37.5, 45, 50, 60, 70 and 80 microns and the radii contained in any range between any of these exemplary values. In some exemplary embodiments, the substantially hemispherically-shaped structures 8 may be smaller, but not so small as to cause diffraction effects, or they may be larger, for example with about 100 or 150 µm radius. Typically, the size of substantially hemispherically-shaped structures 8 should be small enough so as not to be readily apparent to a viewer of a display device containing the optical film. In some exemplary embodiments that are particularly suitable for use in direct-lit backlights, the spacing, size, and shape of the substantially hemispherically-shaped structures 8 can be chosen so that the optical films of the present disclosure aid in hiding from the viewer light sources used in the backlight.

Depending on the desired properties of the optical film 6, the substantially hemispherically-shaped structures 8 may be substantially the same shape and/or size or they may be of at least two or more substantially different shapes and sizes. For example, an optical film constructed according to the present disclosure can include substantially hemispherically-shaped structures of a larger size and substantially hemispherically-shaped structures of a smaller size disposed between the structures of the larger size so as to cover a larger portion of the surface 10. In such exemplary embodiments, a radius of the smaller structure may be about 40% of the radius of a neighboring larger structure, or it may be another suitable radius that is small enough for the smaller structures to be closely packed in a two-dimensional array with the larger structures. In other exemplary embodiments the substantially hemispherically-shaped structures 8 may be of at least three substantially different radii.

The substantially hemispherically-shaped structures 8, and, in some embodiments, at least an adjacent part of the substrate portion 12 including the surface 10, can be made from transparent curable materials, such as low refractive index or high refractive index polymeric materials. With high refractive index materials, higher optical gain may be achieved at the expense of a narrower viewing angle, while with lower refractive index materials, wider viewing angles may be achieved at the expense of lower optical gain. Exemplary suitable high refractive index resins include ionizing radiation curable resins, such as those disclosed in U.S. Pat. Nos. 5,254,390 and 4,576,850, the disclosures of which are incorporated herein by reference to the extent they are consistent with the present disclosure.

In some exemplary embodiments, refractive index of the substantially hemispherically-shaped structures 8 is higher than that of at least a layer of the substrate portion. Some known materials suitable for forming the substantially hemispherically-shaped structures 8 have refractive indices of about 1.6, 1.65, 1.7 or higher. In other exemplary embodiments, the substantially hemispherically-shaped structures 8 may be formed from materials having lower refractive indices, such as acrylic with the refractive index of about 1.58. In some such exemplary embodiments, for a polyethylene terephthalate substrate having a refractive index of about 1.66, a preferred range of refractive indices of the structures 8 (and, perhaps, an adjacent portion of the film) is from about 1.55 to about 1.65.

The substrate portion 12 can have an additional optical characteristic that is different from the optical characteristics of the two-dimensional array of closely packed substantially hemispherically-shaped structures 8, such that the substrate portion manipulates light in a way that is different from the way light is manipulated by the two-dimensional array disposed on the surface 10. Such manipulation may include polarization, diffusion or additional redirection of light transmitted through the optical films of the present disclosure. This may be accomplished, for example, by including in the substrate portion an optical film having such an additional optical characteristic or constructing the substrate portion itself to impart such an additional optical characteristic. Exemplary suitable films having such additional optical characteristics include, but are not limited to, a polarizer film, a diffuser film, a brightness enhancing film such as BEF, a turning film and any combination thereof. Turning film may be, for example, a reversed prism film (e.g., inverted BEF) or another structure that redirects light in a manner generally similar to that of a reversed prism film. In some exemplary embodiments, the substrate portion 12 may include a linear reflective polarizer, such as a multilayer reflective polarizer, e.g., Vikuiti™ Dual Brightness Enhancement Film ("DBEF") or a diffuse reflective polarizer having a continuous phase and a disperse phase, such as Vikuiti™ Diffuse Reflective Polarizer Film ("DRPF"), both available from 3M Company. Additionally or alternatively, the substrate portion may include a polycarbonate layer ("PC"), a poly methyl methacrylate layer ("PMMA"), a polyethylene terephthalate ("PET") or any other suitable film or material known to those of ordinary skill in the art. Exemplary suitable substrate portion thicknesses include about 125 µm for PET and about 130 µm for PC.

Some display device applications could benefit from achieving outputs that are more cylindrically symmetrical, which would be manifested by a more cylindrically symmetrical iso-candela plot, and/or from achieving outputs that have a relatively wide angle of view, which would be manifested by a relatively large half width at half maximum of a corresponding rectangular distribution plot. Typical exemplary embodiments of the present disclosure can have half widths at half maximum of the rectangular distribution plots that are larger than about 33 degrees, for example from 35 degrees to about 40 degrees or greater.

Traditionally, diffusers have been used to widen a field of view of display devices. Unlike most traditional diffusers, the optical films of the present disclosure do not primarily rely on scattering incident light or redirect it due to variations in refractive index within the diffuser's body. Instead, the present disclosure provides optical films that can cause angular spread of the incident light due to the geometrical configuration of their structured surfaces and also provide gain of at least about 1.1.

EXAMPLES

The present disclosure will be further illustrated with reference to the following examples representing modeled properties of some exemplary optical films constructed according to the present disclosure.

Example 1

Figure 3A:
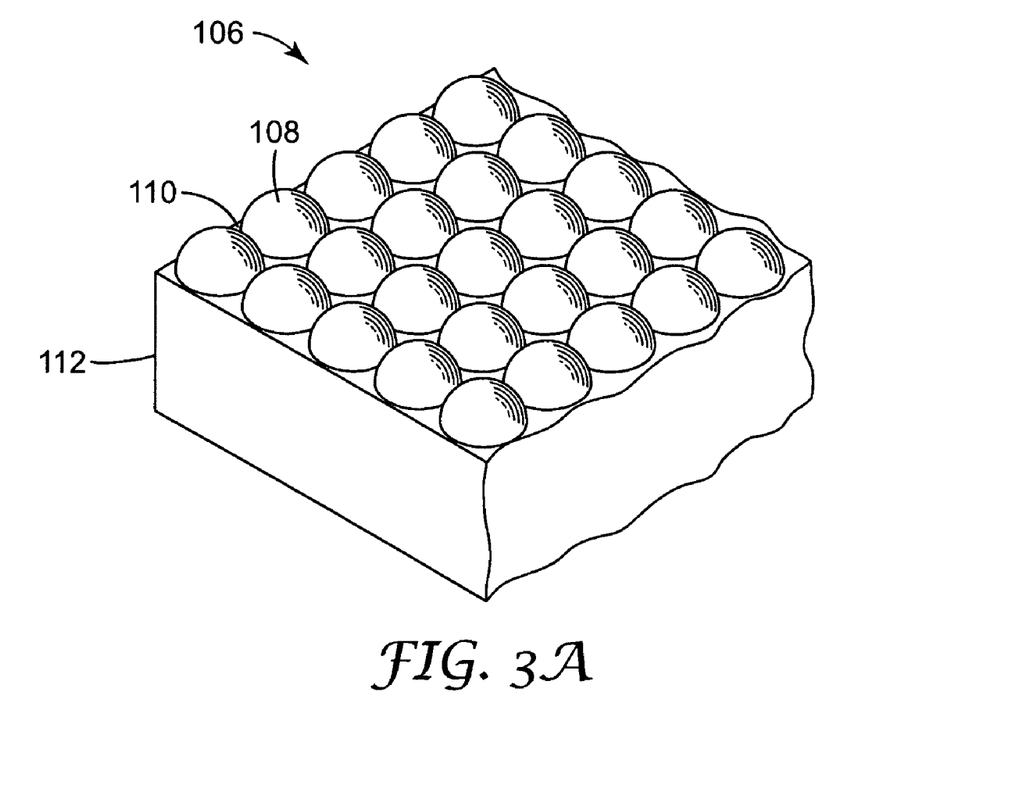
FIG. 3A is a schematic partial perspective view of an exemplary optical film constructed according to the present disclosure.

FIG. 3A shows a schematic partial perspective view of an exemplary modeled optical film 106 according to the present disclosure. The exemplary optical film 106 includes a substrate portion 112 and a structured surface 110 carrying a two-dimensional array of closely packed hemispherically-shaped protrusions 108. In this exemplary embodiment, the protrusions 108 are immediately adjacent to each other. Each protrusion of this exemplary embodiment has a radius of about 25 microns and a refractive index of about 1.58. The substrate portion was modeled as a substantially planar film with a refractive index of about 1.66.

Figure 3B:
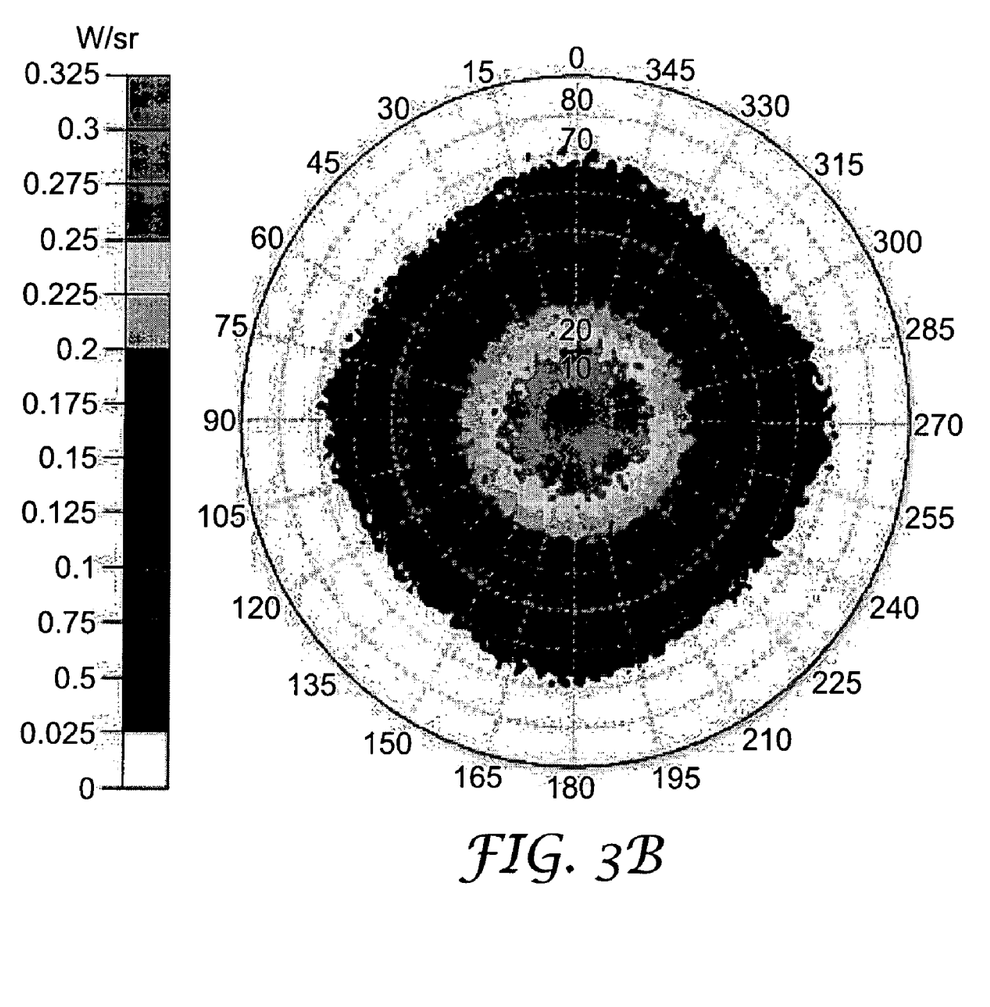
FIG. 3B is an iso-candela polar plot for the exemplary optical film shown in FIG. 3A.

FIG. 3B represents a calculated polar iso-candela distribution plot for light exiting an optical film having the structure substantially as shown in FIG. 3A placed over a backlight with the two-dimensional array of closely packed hemispherically-shaped protrusions 108 facing away from the light source. The distribution for all Examples was calculated using the following model: an extended Lambertian source was used on the first pass of light through the optical film and the remaining light was recycled using a Lambertian reflector with a reflectivity of about 77.4%. As one of ordinary skill in the art will understand, the iso-candela distribution plots show a three hundred and sixty degree pattern of detected incident light rays having passed through the optical film. As it is apparent from FIG. 3B, the output light distribution of this exemplary embodiment has a relatively high degree of cylindrical symmetry, and the intensity decreases relatively monotonically without forming secondary peaks at high angles.

Figure 3C:
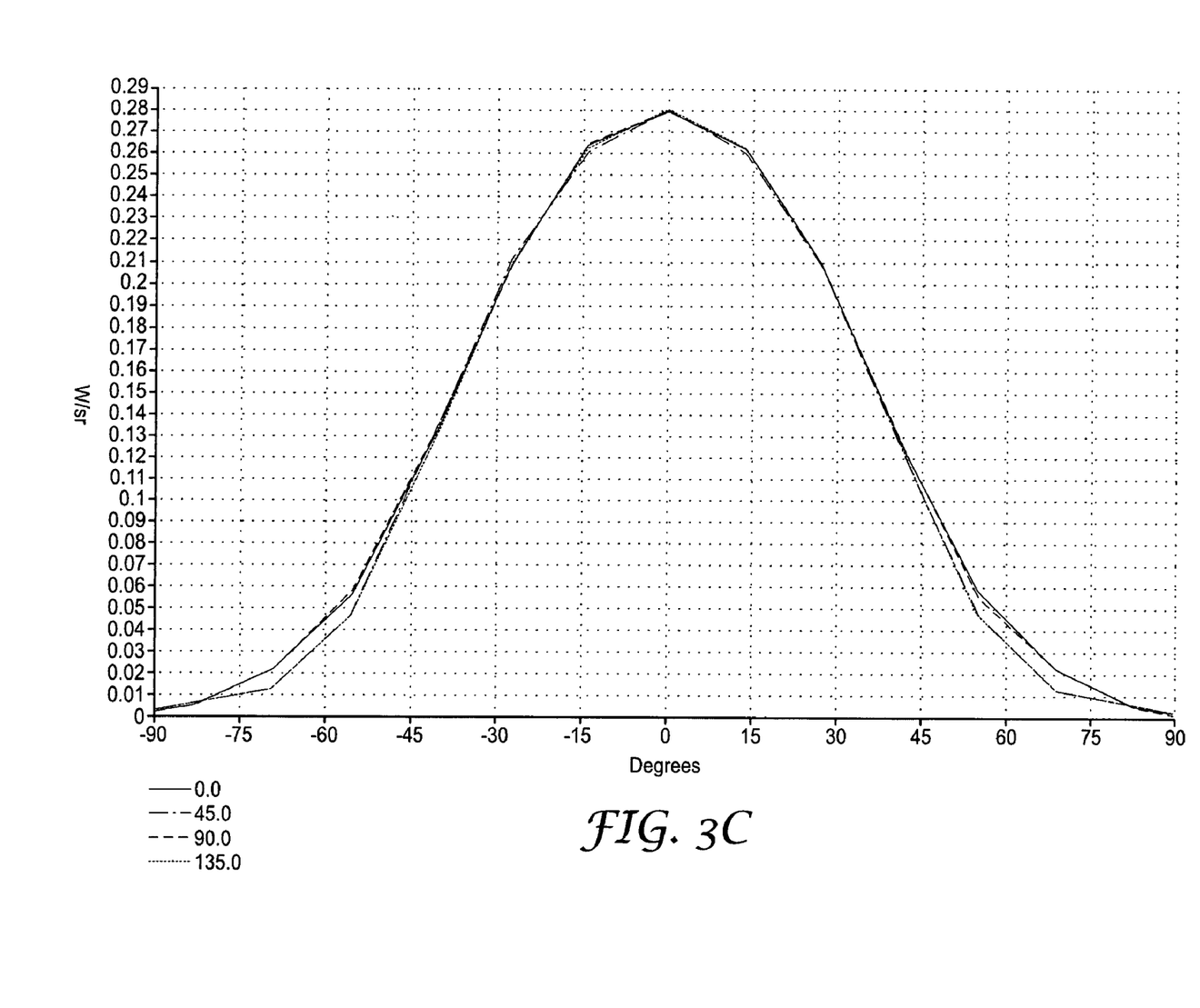
FIG. 3C contains rectangular distribution plots, representing cross-sections of the data shown in FIG. 3B taken at 0, 45, 90 and 135 degree angles.

FIG. 3C shows rectangular candela distribution plots. As one of ordinary skill in the art will understand, each curve on the rectangular distribution plots corresponds to a different cross-section of the polar plot. For example, the curve designated as 0 degrees represents the cross-section of the polar plot along the line passing through the center that connects 0 and 180 degrees, the curve designated as 45 degrees represents the cross-section of the polar plots along the line passing through the center that connects 45 and 225 degrees, the curve designated as 90 degrees represents the cross-section of the polar plots along the line passing through the center that connects 90 and 270 degrees, and the curve designated as 135 degrees represents the cross-section of the polar plots along the line passing through the center that connects 135 and 315 degrees. FIG. 3C also illustrates a relatively high degree of cylindrical symmetry of the output light distribution of this exemplary embodiment, as well as relatively monotonically decreasing intensity without secondary peaks at high angles. This conclusion is illustrated by relatively small differences between the rectangular intensity plots for different angles. The rectangular plots also show appreciable widths of the curves with the average half width at half maximum of about 40 degrees, which indicates increased amount of diffusion and a widened viewing angle. Modeled optical gain for the exemplary gain diffusers constructed according to FIG. 3A was found to be about 1.48.

Example 2

Figure 4A:
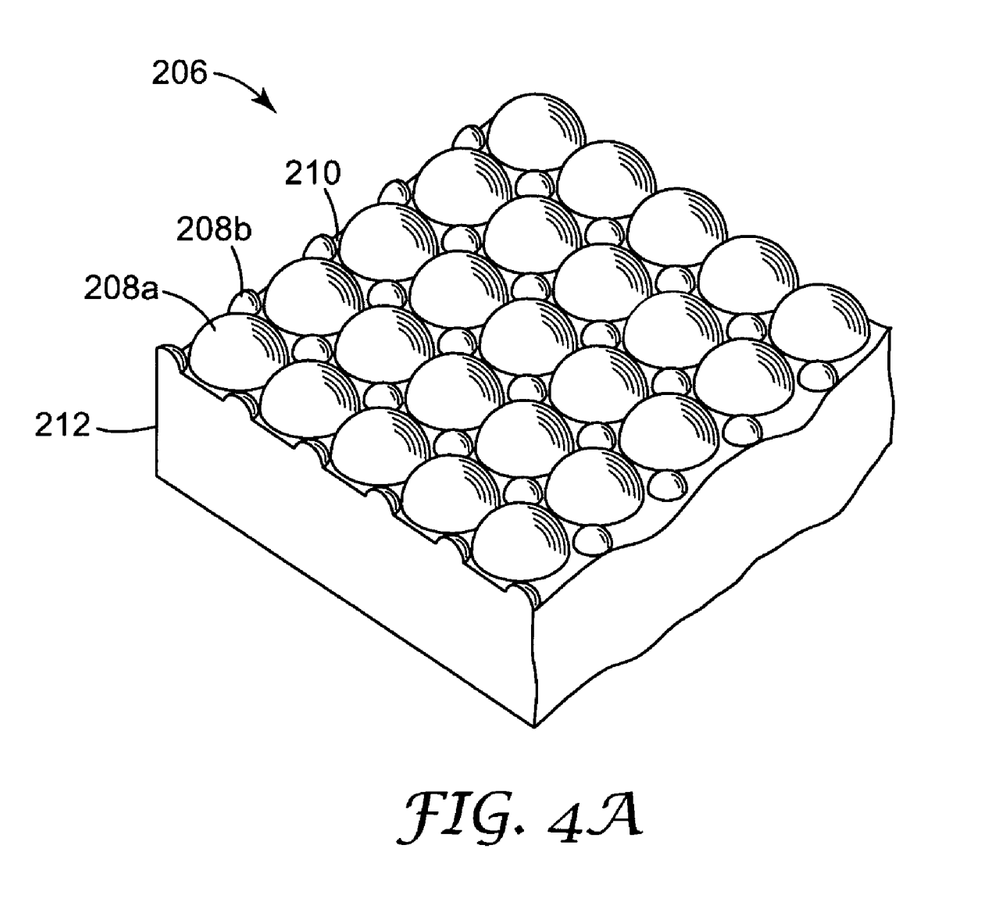
FIG. 4A is a schematic partial perspective view of another exemplary optical film constructed according to the present disclosure.

FIG. 4A shows a schematic partial perspective view of an exemplary optical film 206 constructed according to the present disclosure. The exemplary optical film 206 includes a substrate portion 212 and a structured surface 210 carrying a two-dimensional array of closely packed hemispherically-shaped protrusions 208a and 208b. The two-dimensional array of closely packed hemispherically-shaped protrusions of this exemplary embodiment includes larger protrusions 208a having about the same size and smaller protrusions 208b having about the same size disposed immediately adjacent to each other, so that the smaller protrusions 208b are located in the areas left void by the larger protrusions 208a. This configuration aids in filling the surface 210 with a higher density. The larger protrusions 208a were modeled as hemispheres of about 25 micron radii and each of the smaller protrusions 208b was dimensioned to fit between and immediately adjacent to the surrounding larger protrusions 208a and had a radius of about 10 microns. Each protrusion of this exemplary embodiment has a refractive index of about 1.58. The substrate portion was modeled as a substantially planar film with a refractive index of about 1.66.

Figure 4B:
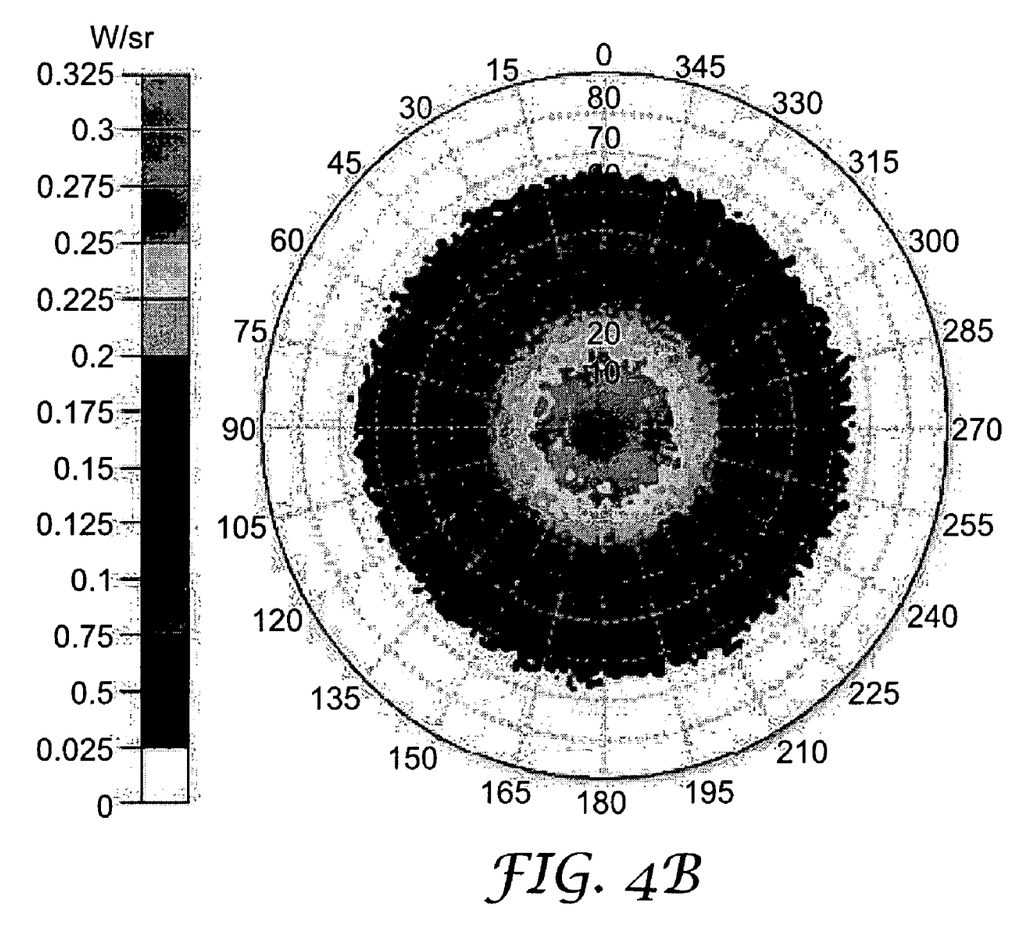
FIG. 4B is an iso-candela polar plot for the exemplary optical film shown in FIG. 4A.

FIG. 4B represents a calculated polar iso-candela distribution plot for light exiting an optical film having the structure substantially as shown in FIG. 4A placed over a backlight with the two-dimensional array of closely packed hemispherically-shaped protrusions 208a and b facing away from the light source. As it is apparent from FIG. 4B, the output light distribution of this exemplary embodiment has a relatively high degree of cylindrical symmetry, and the intensity decreases relatively monotonically without forming secondary peaks at high angles.

Figure 4C:
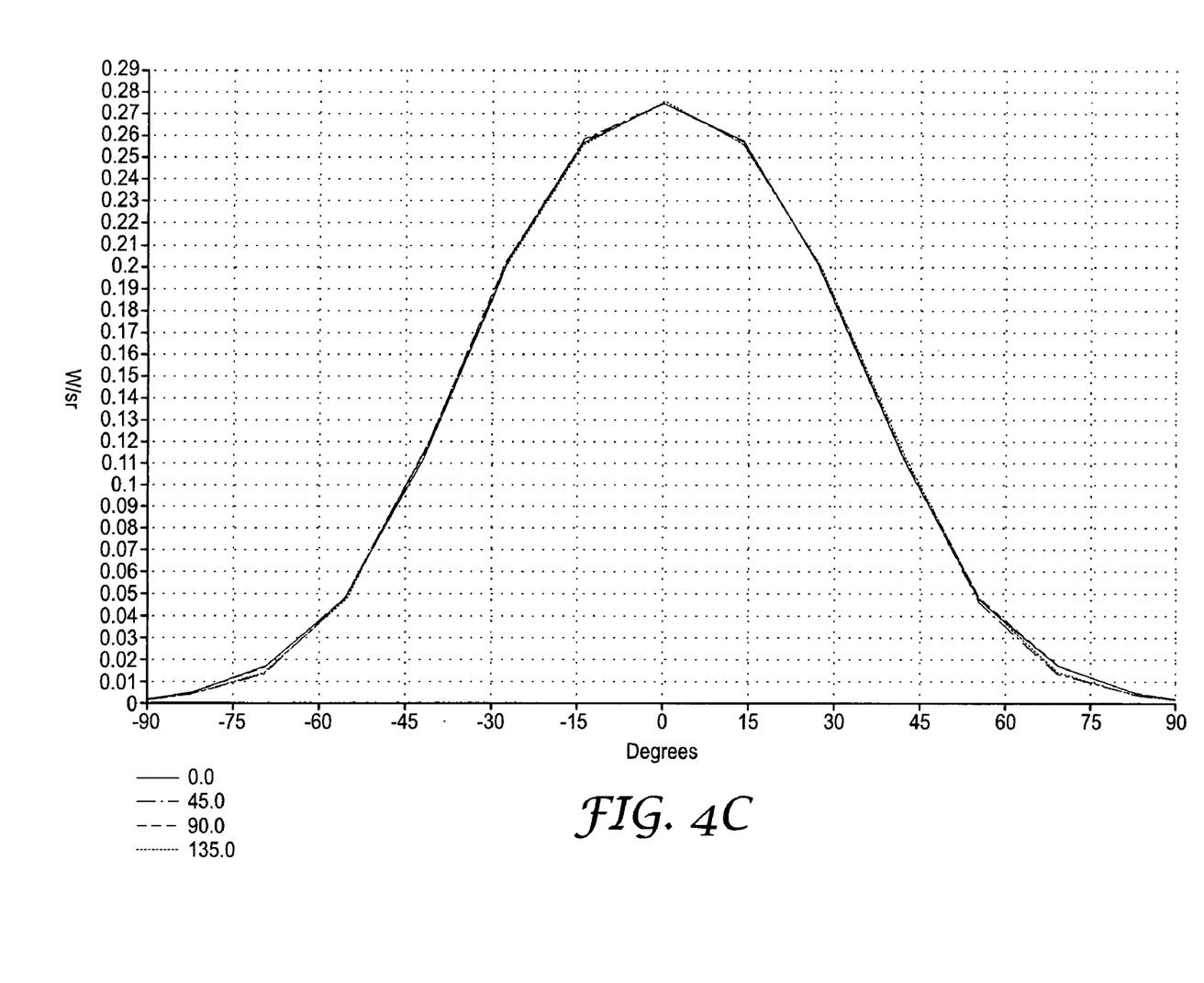
FIG. 4C contains rectangular distribution plots, representing cross-sections of the data shown in FIG. 4B taken at 0, 45, 90 and 135 degree angles.

FIG. 4C shows rectangular candela distribution plots corresponding to different cross-sections of the polar plot at 0, 45, 90 and 135 degrees. FIG. 4C also illustrates a relatively high degree of cylindrical symmetry of the output light distribution of this exemplary embodiment, as well as relatively monotonically decreasing intensity without secondary peaks at high angles. This conclusion is illustrated by small differences between the rectangular candela plots for different angles. The rectangular plots also show appreciable widths of the curves, with the average half width at half maximum of about 37 degrees, which indicates a widened viewing angle. Modeled optical gain for the exemplary optical films constructed according to FIG. 4A was found to be about 1.50.

Example 3

Figure 5A:
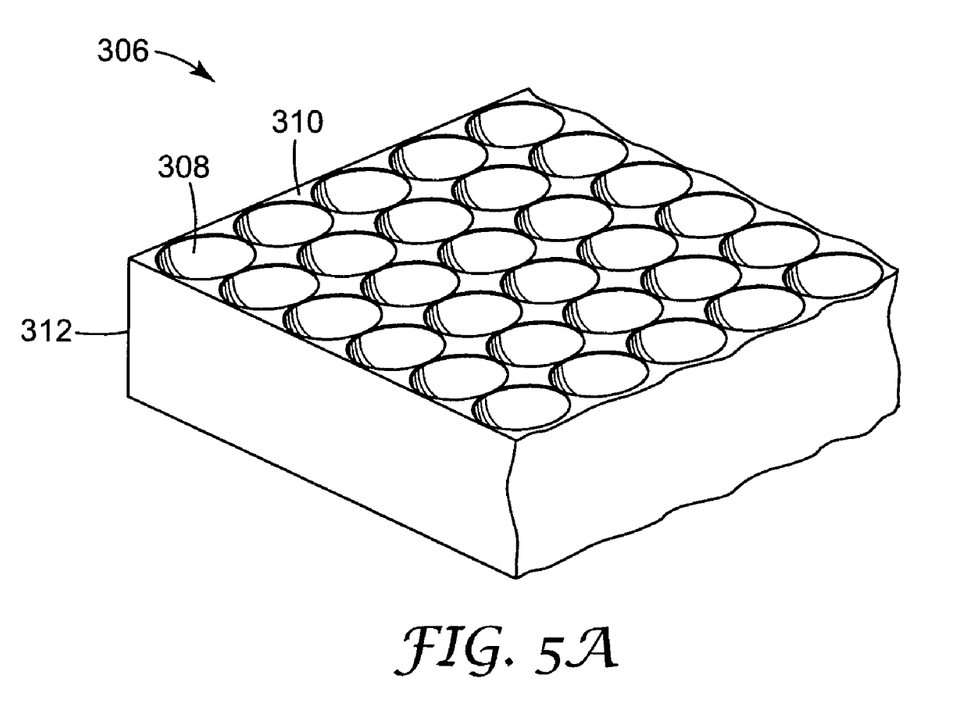
FIG. 5A is a schematic partial perspective view of another exemplary optical film constructed according to the present disclosure.

FIG. 5A shows a schematic partial perspective view of an exemplary optical film 306 constructed according to the present disclosure. The exemplary optical film 306 includes a substrate portion 312 and a structured surface carrying a two-dimensional array of closely packed hemispherically-shaped depressions 308. In this exemplary embodiment, the depressions 308 are immediately adjacent to each other. Each depression of this exemplary embodiment has a radius of about 25 microns and is disposed in a film portion having a refractive index of about 1.58. The substrate portion was modeled as a substantially planar film with a refractive index of about 1.66.

Figure 5B:
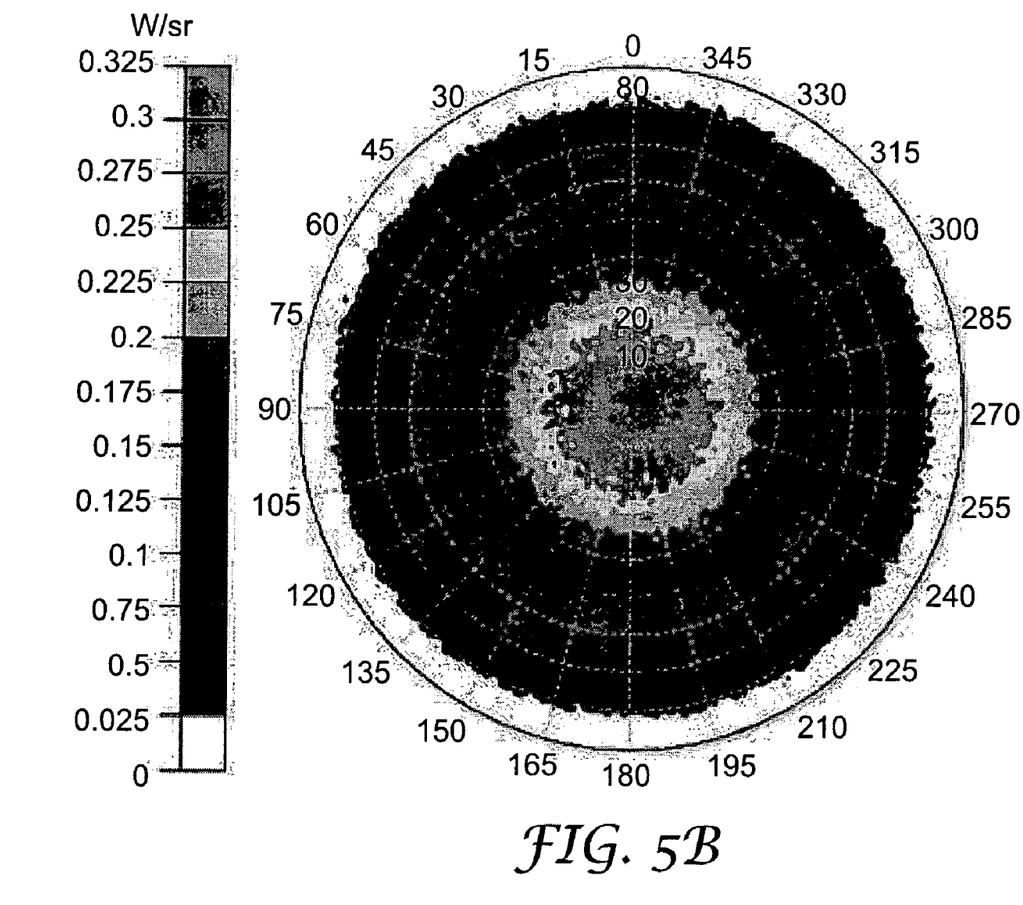
FIG. 5B is an iso-candela polar plot for the exemplary optical film shown in FIG. 5A.

FIG. 5B represents a calculated polar iso-candela distribution plot for light exiting an optical film having the structure substantially as shown in FIG. 5A placed over a backlight with the two-dimensional array of closely packed substantially hemispherically-shaped depressions 308 facing away from the light source. As it is apparent from FIG. 5B, the output light distribution of this exemplary embodiment has a relatively high degree of cylindrical symmetry, and the intensity decreases relatively monotonically without forming secondary peaks at high angles.

Figure 5C:
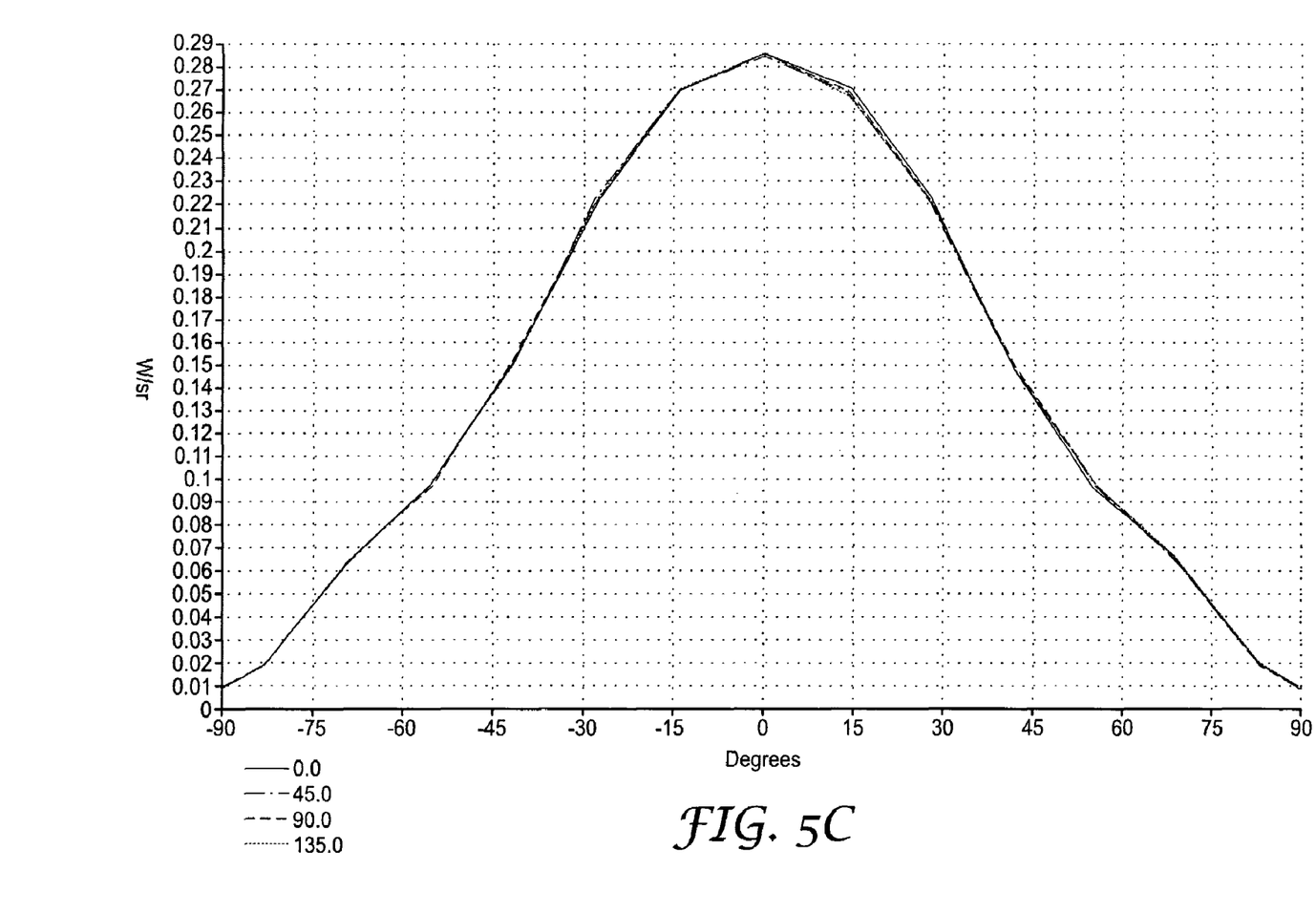
FIG. 5C contains rectangular distribution plots, representing cross-sections of the data shown in FIG. 5B taken at 0, 45, 90 and 135 degree angles.

FIG. 5C shows rectangular candela distribution plots corresponding to different cross-sections of the polar plot at 0, 45, 90 and 135 degrees. FIG. 5C also illustrates a relatively high degree of cylindrical symmetry of the output light distribution of this exemplary embodiment, as well as relatively monotonically decreasing intensity without secondary peaks at high angles. This conclusion is illustrated by insignificant differences between the rectangular intensity plots for different angles. The rectangular plots also show appreciable widths of the curves with the average half width at half maximum of about 43 degrees, which indicates increased amount of diffusion and a widened viewing angle. Modeled optical gain for the exemplary optical films constructed according to FIG. 5A was found to be about 1.21.

Exemplary optical films according to the present disclosure can be made by micro-replication from a tool, spray coating, ink jet printing or any other method known to those of ordinary skill in the art.

Thus, the present disclosure provides optical films that can be configured to exhibit a specific controllable angular spread of light on the viewing side and a more cylindrically symmetrical output distribution of light without loss of transmission. Further, the optical films of the present disclosure exhibit optical gain. The amounts of gain and angular spread will depend on the specific configuration of the surface structures and may be varied to achieve the performance desired for a particular application. In addition, the structure of the embodiments of the present disclosure is such that they can have increased robustness, since the surface features are rounded.

Although the optical films and devices of the present disclosure have been described with reference to specific exemplary embodiments, those of ordinary skill in the art will readily appreciate that changes and modifications may be made thereto without departing from the spirit and scope of the present disclosure.

What is claimed is:

1. An optical device comprising:
   a light source;
   an optical film having a first surface disposed to receive light from the light source, the optical film comprising a polarizer and a substrate portion, the optical film further having a second surface facing away from the light source, the second surface comprising a two-dimensional array of closely packed substantially hemispherically-shaped structures having a refractive index that is lower than a refractive index of the substrate portion; and
   a liquid crystal display panel disposed to receive light transmitted through the optical film;
   wherein light transmitted through the optical film exhibits uniform polarization and wherein the two-dimensional array of closely packed substantially hemispherically-shaped structures redirects light transmitted through the optical device so that the film exhibits axial output luminance gain of at least about 1.1 relative to the axial output luminance of the optical device absent the optical film.

2. The optical device of claim 1, wherein the optical film comprises a linear reflective polarizer.

3. The optical device of claim 1, wherein the second surface comprises a plurality of closely packed substantially hemispherically-shaped depressions.

4. The optical device of claim 1, wherein the second surface comprises a plurality of closely packed substantially hemispherically-shaped protrusions.

5. The optical device of claim 1, wherein the second surface comprises a pluralities of closely packed substantially hemispherically-shaped structures having a radius of at least about 5 μm.

6. The optical device of claim 1, wherein, the second surface comprises a plurality of closely packed substantially hemispherically-shaped structures having a radius of about 10 about 50 μm.

7. The optical device of claim 1, wherein the second surface comprises pluralities of closely packed substantially hemispherically-shaped structures of at least two different radii.

8. The optical device of claim 1, further comprising a light distribution element optically coupled to the light source and disposed to supply light to the optical film.

9. The optical device of claim 8, wherein the light distribution element is a lightguide.

10. An optical device comprising:
    a light source;
    an optical film having a first surface disposed to receive light from the light source and a second surface facing away from the light source, the second surface comprising a two dimensional array including a first plurality of substantially hemispherically-shaped structures having a first radius and a second plurality of substantially hemispherically-shaped structures having a second radius different from the first radius, wherein the first and second pluralities of structures are closely packed; and
    a liquid crystal display panel disposed to receive light transmitted through the optical film;
    wherein the optical film comprises a substrate portion having an optical characteristic different from optical characteristics of the second surface comprising the two dimensional array; and
    wherein the two-dimensional array of pluralities of substantially hemispherically-shaped structures redirects light transmitted through the optical device exhibits so that the film exhibits axial output luminance gain of at least about 1.1 relative to the axial output luminance of the optical device absent the optical film.

11. The optical device of claim 10, wherein the substrate portion comprises at least one of: a polarizer film, a diffuser film, a brightness enhancing film, a turning film or a combination thereof.

12. The optical device of claim 10, wherein the optical film further comprises a substrate portion and wherein the closely packed substantially hemispherically-shaped structures have a refractive index that is lower than a refractive, index of the substrate portion.

13. The optical device of claim 10, wherein the closely packed substantially hemispherically-shaped structures have an average radius of at least about 5 μm.

14. The optical device of claim 10, further comprising a light distribution element optically coupled to the light source and disposed to supply light to the optical film.

15. The optical device of claim 14, wherein the light distribution element is a lightguide.

* * * * *

UNITED STATES PATENT AND TRADEMARK OFFICE
CERTIFICATE OF CORRECTION

PATENT NO. : 7,416,309 B2 Page 1 of 1
APPLICATION NO. : 11/026940
DATED : August 26, 2008
INVENTOR(S) : Byung-Soo Ko It is certified that error appears in the above-identified patent and that said Letters Patent is hereby corrected as shown below:

Under item (56) References Cited
Page 2, Column 2,
Under "Other Publications," delete "4.1 -4.4," and insert -- 4.1 - 4.4 --, therefor.

Column 9,
Line 40, claim 5, delete "pluralities" and insert -- plurality --, therefor.
Line 46, claim 6, after "10" insert -- to --.

Column 10,
Line 38, claim 12, delete "refractive," and insert -- refractive --, therefor.

Signed and Sealed this

Sixth Day of January, 2009

JON W. DUDAS
*Director of the United States Patent and Trademark Office*